(12) United States Patent
Walter et al.

(10) Patent No.: US 9,596,451 B2
(45) Date of Patent: Mar. 14, 2017

(54) DEVICE FOR MONITORING AT LEAST ONE THREE-DIMENSIONAL SAFETY AREA

(75) Inventors: Christoph Walter, Magdeburg (DE);
Christian Vogel, Magdeburg (DE);
Norbert Elkmann, Magdeburg (DE)

(73) Assignees: FRAUNHOFER GESELLSCHAFT ZUR FÖDERUNG DER ANGEWANDTEN FORSCHUNG E.V. (DE);
OTTO-VON-GUERICKE-UNIVERSITÄT MAGDEBURG (DE)

( * ) Notice: Subject to any disclaimer, the term of this patent is extended or adjusted under 35 U.S.C. 154(b) by 606 days.

(21) Appl. No.: 13/640,685

(22) PCT Filed: Apr. 15, 2011

(86) PCT No.: PCT/EP2011/001967
§ 371 (c)(1),
(2), (4) Date: Dec. 19, 2012

(87) PCT Pub. No.: WO2011/128117
PCT Pub. Date: Oct. 20, 2011

(65) Prior Publication Data
US 2013/0201292 A1    Aug. 8, 2013

(30) Foreign Application Priority Data
Apr. 16, 2010  (DE) .................. 10 2010 015 765

(51) Int. Cl.
*H04N 13/02* (2006.01)
*F16P 3/14* (2006.01)
(Continued)

(52) U.S. Cl.
CPC ............... *H04N 13/02* (2013.01); *F16P 3/14* (2013.01); *F16P 3/142* (2013.01); *F16P 3/144* (2013.01); *G01S 17/026* (2013.01); *G01V 8/10* (2013.01)

(58) Field of Classification Search
CPC ........ H04N 13/02; G01S 17/026; G01V 8/10; F16P 3/14; F16P 3/142; F16P 3/144
See application file for complete search history.

(56) References Cited

U.S. PATENT DOCUMENTS

2001/0041077 A1  11/2001  Lehner et al.
2002/0125435 A1*  9/2002  Cofer ..................... G01B 11/25
                                                        250/341.1
(Continued)

FOREIGN PATENT DOCUMENTS

DE          19938639          2/2001

*Primary Examiner* — Behrooz Senfi
*Assistant Examiner* — Maria Vazquez Colon
(74) *Attorney, Agent, or Firm* — Altera Law Group, LLC

(57) ABSTRACT

The Invention relates to a device for monitoring at least one three-dimensional safety area, in particular a region in shared work areas of people and machines, comprising at least one capturing device that is pointed at the safety area and captures images of the safety area, and an analyzing device for analyzing the images that are captured by the capturing device in order to determine whether or not persons or objects have entered the safety area. At least one projector is arranged with respect to the safety area such that said projector projects lines or patterns as modulated light, said lines or patterns defining the safety area. The analyzing device analyzes the images for interruptions and/or changes of the projected lines.

12 Claims, 2 Drawing Sheets

Figure 1:
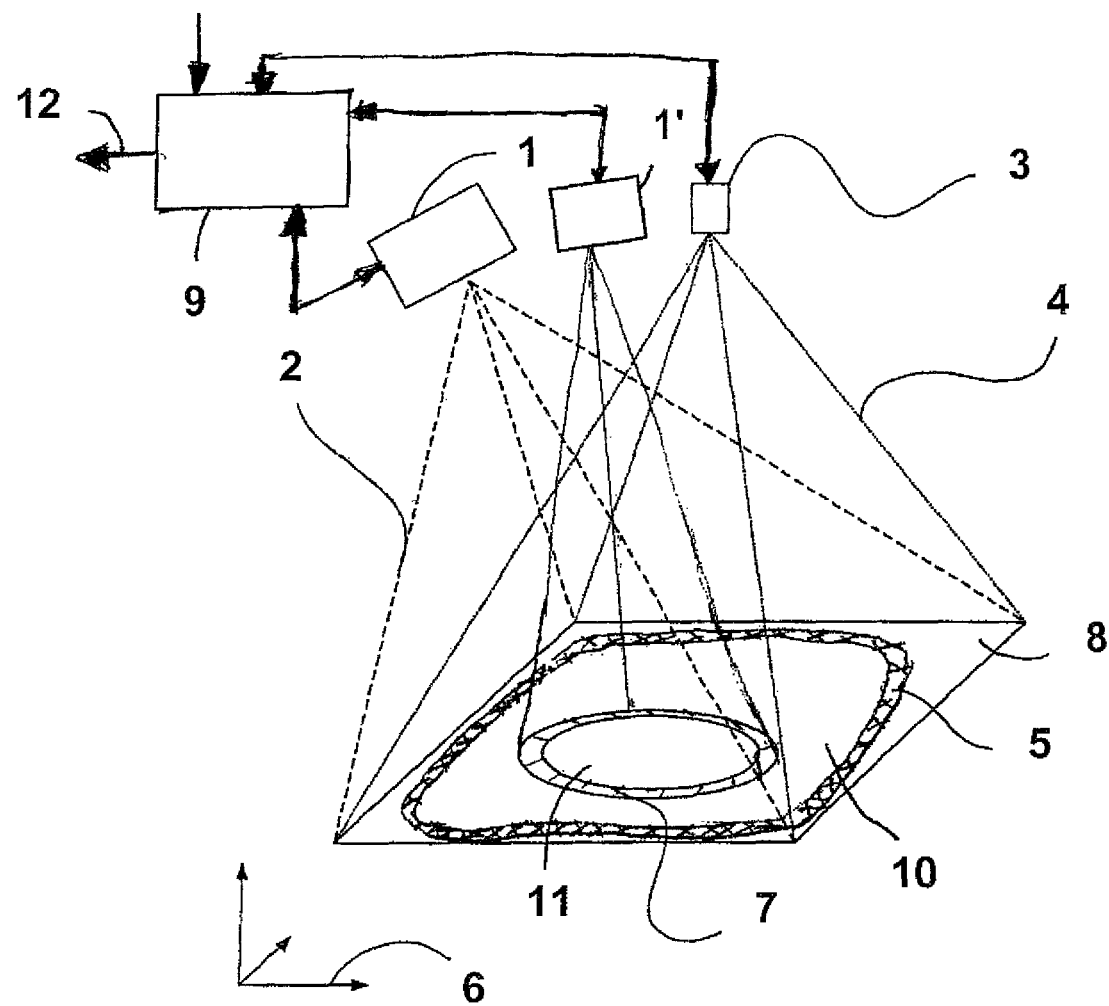

(51) Int. Cl.
*G01S 17/02* (2006.01)
*G01V 8/10* (2006.01)

(56) References Cited

U.S. PATENT DOCUMENTS

| | | | |
|---|---|---|---|
| 2002/0150278 A1 | 10/2002 | Wustefeld | |
| 2003/0075675 A1* | 4/2003 | Braune | G01S 7/4802 250/221 |
| 2008/0152192 A1* | 6/2008 | Zhu et al. | 382/103 |
| 2010/0013917 A1* | 1/2010 | Hanna | G06K 9/00771 348/143 |
| 2010/0172567 A1* | 7/2010 | Prokoski | A61B 5/0064 382/132 |
| 2011/0228086 A1* | 9/2011 | Cordero | G08B 13/19636 348/143 |

* cited by examiner

DEVICE FOR MONITORING AT LEAST ONE THREE-DIMENSIONAL SAFETY AREA

The invention relates to a device for monitoring at least one three-dimensional safety area, in particular a region in snared work areas of people and machines, according to the preamble of the main claim.

In workspaces in which people and machines, in particular including robots, operate, it must be ensured at all times that the people do not sustain injuries, for example as a result of colliding with the machine or robot. Safety areas, in which there is a potential risk of injury to people, are defined to prevent collisions of this type.

Different methods and devices have previously been used to establish safety areas, for example partitioning safety devices in combination with mechanical systems, such as pressure-sensitive mats, door openers or the like, optical systems such as laser scanners, light barriers, light curtains, or optical image-processing systems.

Partitioning safety devices enclose the safety area of the robot and thus form an impenetrable boundary between man and machine. Interfaces to the safety area are safeguarded by sensors and deactivate the robot if an object is detected. Collisions between man and machine are thus prevented. The disadvantages of these enclosures are the high installation cost, inflexibility and large spatial requirement. Direct interaction with the robot is also made impossible or is only possible to a limited extent due to the partition walls.

Monitoring solutions based on sensory technology operate on the principle that people or objects in the relevant workspace are detected by way of sensor. The infiltration of objects or people into safety-critical areas of the workspace, that is to say into areas in which parts of the robot or machine move, is then detected with the aid of the data obtained. For example, the facility may then be stopped in response to such a situation.

In recent years, increasing numbers of publications have appeared regarding the use of optical, image-processing systems for monitoring safety areas. Multi-camera systems, stereo cameras or time-of-flight cameras (PMD cameras) are used.

A method and a device for monitoring a three-dimensional domain are known from WO 2008/061607/A1, in which two cameras monitor a safety area and are arranged and aligned relative to one another such that stereoscopic three-dimensional image capture is possible or both image capture units operate redundantly to one another without stereoscopic image capture taking place. If a danger situation is identified on the basis of the three-dimensional image capture, a robot working in the safety area is switched off.

A further method, which is disclosed in WO 2007/035330 A1, involves the generation of 2½-D images or 3-D images of the ambient environment and defines the safety area by means of static markings on the floor. A crossing of these markings by people or objects and safety area breaches are detected and identified with the aid of fixedly installed cameras. Since the safety areas have to be defined manually by corresponding markings, which is costly, this method and the corresponding device cannot be implemented in a versatile manner.

The object of the invention is therefore to create a device for monitoring at least one three-dimensional safety area, said device enabling quick adaptation to dynamic safety areas, that is to say activatable and deactivatable safety areas, which can also be changed in terms of they expanse and/or layout, and said device allowing simple processing that is not processor-intensive, that is to say that requires evaluation in real time, for the analysis of the data established by an image-processing device.

This object is achieved in accordance with the invention by the characterising feature of the main claim in conjunction with the features of the preamble.

Advantageous developments and improvements are possible as a result of the measures disclosed in the dependent claims.

Since at least one projector is arranged with respect to a monitored area in such a way that it projects markings defining the safety area in the form of modulated light at a predefined frequency, for example onto the floor of the monitoring region, and since the evaluation device evaluates the images for interruption or changes of the form and/or size and/or position of the markings, a monitoring device is provided with which the safety area(s) can be changed with little effort and cost. The capturing device is tuned to the predefined frequency and the evaluation device is designed to compare, from the captured images, a binary current image of the safety area with a binary target image of the projected safety area, said target image being determined for the at least one capturing device. Since no evaluation of 2½-D or 3-D images of the ambient environment is necessary, and the images are instead evaluated, for interruption or luminous change of the markings, it is possible to dispense with complex, processor-intensive algorithms for the analysis or data processing of the sensor data, that is to say the data of the capturing device. Simple image-processing operations, such as addition and subtraction of chronologically successive pixel values, can be used for the detection of safety area breaches, and processor effort can thus be saved. To detect breaches of a protected region, an algorithm can be selected that has a deterministic operating time, which is constant for a specific configuration and can thus be used in real-time systems. In a preferred exemplary embodiment, the at least one projector and the at least one capturing device are designed to create, alternately, an image of the monitored area with projected safety area and an image of the monitored area without projected safety area.

The binary target image, as a virtual target image, can be determined or calculated by the evaluation device via the knowledge of the known position and alignment and by means of the parameters of the projected safety area.

The binary current image can preferably be determined by addition and subtraction of the successive images of the monitored area, with and without projected safety area, and a breach of the safety area, as well as possible defects or misalignments of the projector and/or of the capturing device (if the safety area has not been breached), can accordingly be determined by addition and subtraction of the binary current image and of the binary, virtual target image.

Commercially available technology can be used in principle for the at least projector and for the capturing device. The monitoring device according to the invention may be adapted individually to the respective requirements by using any number of projectors and capturing devices, and it can therefore be used equally to monitor both individual, small safety areas and also larger, more dispersed safety areas.

Different types of projectors and capturing devices, such as projectors of which the emitted light is white and/or coloured and may be visible or invisible to humans, and capturing devices that are adapted, to this light, can be used.

Dynamic changes to the respective safety areas, such as positron and size, can be taken into account by adaptation to the current processing step of the machine and also to the current level of danger posed thereby.

As a result of the use of light which is modulated in terms of brightness and/or colour with a specific modulation frequency, the markings can be reliably distinguished from ambient light, which may possibly also be somewhat modulated, the markings or patterns are formed in the preferred exemplary embodiment as borders projected by the at least one projector and are implemented as lines and/or patterns.

In some situations, it is also advantageous for the projected lines or patterns to be variable over time and/or in terms of their form and/or in terms of their presentation. This means that clear patterns or markings, which vary over time and are projected, can also be implemented in addition to, or with use of, light that is modulated in terms of its intensity or colour, or pulsed light. The presentation or form of the markings may be different in this instance, for example numbers, letters, symbols/structures of any type can be projected and may flash and/or change colour and may be provided as a moving effect or the like.

In addition to the lines and/or patterns projected onto the floor of the area to be safeguarded, information in the form of a light script or in the form of light pictograms can also be projected, that is to say not only is the border area of the workspace or safety area displayed visually to people, but further information may also be illustrated. An example of such information is a display indicating for how long the area is still to be blocked, or the time at which it can again be entered by people. Additional information having nothing to do with the safety area, such as information regarding the status of the facility or of the robot, current and subsequent processing steps, etc., can also be displayed by superimposition and thus provided to the operating personnel.

In a particularly advantageous exemplary embodiment, a plurality of spatial safety areas, which are nested one inside the other or intersect one another, can be projected. For example, a warning field can be projected as a safety area, in which the actual, smaller protected field is embedded. Merely one projector and one capturing device are likewise necessary, as minimum, for this exemplary embodiment, although more can be used however.

As an advantageous exemplary embodiment, the light of the at least one projector may lie in the infrared range. This variant thus includes the projection of light that is not visible to humans, wherein an associated capturing apparatus (for example an infrared camera) has to be selected. This exemplary embodiment is used if people are not supposed to, or must not, know about the workspace or the safety area.

The device according to the invention can be adapted to the individual requirements by any number of projectors and capturing devices. It can therefore be used equally to monitor both individual, small safety areas and also larger or more dispersed safety areas, wherein the simultaneous arrangement of a plurality of capturing devices around the projection field reduces the likelihood of any hidden areas. The number of projectors and cameras used may be the same or different.

As a result of the use of a plurality of projectors, the safety area can be divided into portions over the projectors in such a way that each projector projects a part of the safety area, whereby the entire safety area is projected overall. This may be necessary in particular in cases in which the use of an individual projector for projection of a safety area around a machine is not possible, or is only possible to a limited extent, due to the overall dimensions of said machine.

As a result of the use of a plurality of capturing devices, one or more safety areas may be monitored redundantly and/or the capturing devices may be divided to monitor portions of the safety area in such a way that the entire safety area is monitored overall.

The use as a monitoring device is conceivable wherever specific attention needs to be paid in a defined area. These areas include, above all, areas in which protection for people is provided, for example where there is an existing risk of injury, to safeguard against unauthorised access, for example to safeguard against theft by safeguarding against unauthorised exit, and for specific visualisation, for example to illustrate potential risks. Areas in which protection for people is required are primarily safety areas in which there is human/robot interaction. In this case, the safety area is determined around the robot and leads to a defined response if breached, for example to emergency shutdown of the robot. The areas to be safeguarded against unauthorised access are generally to be safeguarded against other people or objects. This may concern protection against a possible danger, for example the temporary presence of a substance that poses a risk to health, or for example may concern the protection of property against theft. For specific visualisation, areas require a specific presentation of information. Individual representations of any sort, such as future movement, change in direction, status of an object or robot, can be implemented by flashing, colour-changing dynamic projections of images, patterns or structures.

The device according to the invention can be formed as a fixed device, but can also be used in a mobile manner. The projector and capturing device, for example a camera, can be attached to any mobile systems, such as a mobile robot. They can also be attached to the robot at, or near, the TCP (tool centre point) and can thus safeguard movement areas of moved or mobile systems.

The properties of the device according to the invention concern the reduction of environmental influences, such as changing light conditions or sudden shadowing, on the accuracy/robustness of the detection and also concern the monitoring of the functionality (intrinsic safety) of the components (capturing devices and projectors). The invention further provides the option of changing safety areas in terms of shape, position and size during interruption of the machine operation and also without interruption thereof, and of simultaneously monitoring these safety areas. The change can be made manually or in particular dynamically according to different parameters, such as machine position and machine trajectory, and can be linked to a robot control system for example.

Furthermore, the safety areas are subject to hardly any limitations in the case of the invention. No specific shapes, geometrical structures, colours or other features (such as centre of gravity, gradients, etc.) are defined. Safety areas consist of individual geometrical elements, such as dots, lines or circles, which can adopt any complex shapes by combination of various lengths and widths. The safety areas do not have to consist of closed lines. Individual dots and individual lines are also equally possible. Full-area or sub-area monitoring, that is to say safety areas in which not only is the line delimiting the safety area monitored, but also the entire or partial inner region, can likewise be implemented. Safety areas may equally consist of combinations of the aforementioned forms, for example dots, individual lines and sub areas or full areas.

It is advantageous if defects in the capturing device and/or the projector can be determined. If a projector and/or capturing device is/are faulty or if these components are no longer aligned precisely relative to one another, this likewise leads to detection of a breach of the safety area. As a result of the calibration of the capturing device and projector, the projected image is "known" in the image of the capturing device, and a breach of the safety area by objects, faulty components (capturing device/projector) or incorrect orientation between the capturing device and the projector lead to a "breach signal". Conversely, this means that, if there is no detection of a breach, the components are functioning correctly and are also aligned precisely relative to one another.

This constitutes one of the main advantages with regard to the intrinsic safety of the system.

The device according to the invention allows a dynamic adaptation of the safety area in real time, and therefore a safety area surrounding a robot for example can be adapted such that it is always designed optimally for people in terms of freedom of movement, with consideration of the movement of the robot.

Figure 2:
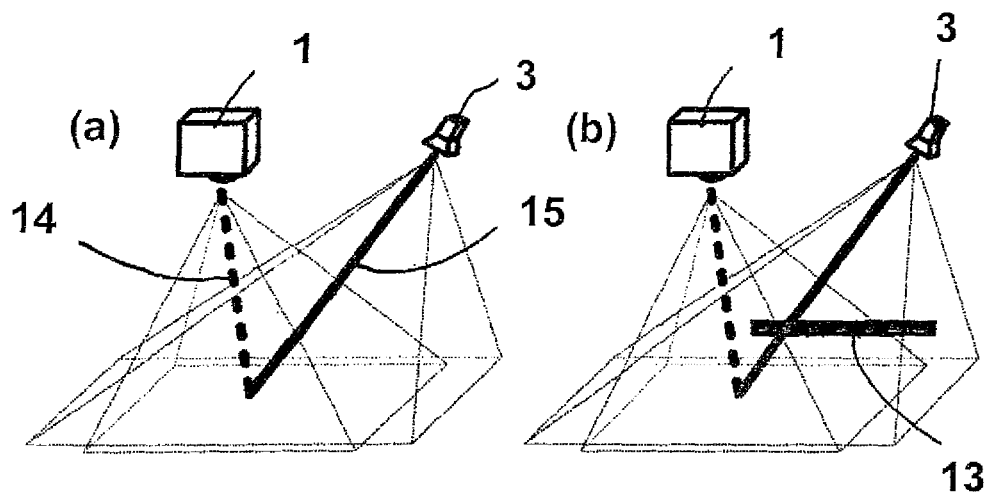
Figure 3:
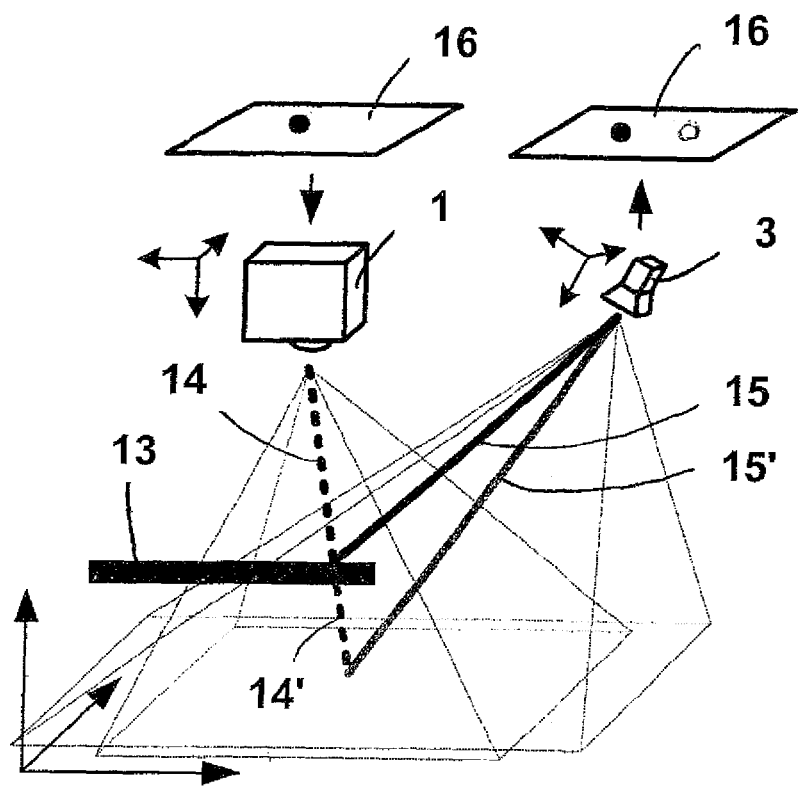

An exemplary embodiment of the invention is illustrated in the drawing and will be explained in greater detail in the following description. In the drawing:

FIG. 1 shows a schematic illustration of the device according to the invention for monitoring with projected safety areas;

FIG. 2: shows a schematic view of a safety area with a projector and capturing device with a light beam (a) and a line of sight (b), both with and without interruption of the line of sight; and FIG. 3: shows a schematic view of a safety area with a projector and a capturing device with a light beam and a line of sight, with interrupted light beam and changed pixel position of the corresponding line of sight in the image plane of the capturing device.

The monitoring device according to the invention comprises at least one projector, in the illustrated exemplary embodiment two projectors 1, 1', and at least one capturing device, which is formed as a camera 3 in the exemplary embodiment, these being arranged in a stationary manner above a detected area 8. The intersecting area between a field of sight 4 of the camera 3 and a projection area 2, in this case of the projector 1, define this detected area 8. The projectors 1, 1' and the camera 3 are calibrated to a global coordinate system 6, illustrated schematically.

The camera 3 and the projectors 1, 1' are connected to an evaluation device 9, which comprises a control unit, wherein the control unit controls the projectors 1, 1' with regard to the projection of markings 5, 7. The markings 5, 7 form borders for safety areas 10, 11, wherein the safety area 11 lies within the safety area 10. The markings 5, 7 are linear and, in the present exemplary embodiment, have two different patterns, which are used exclusively as additional information to allow the user to distinguish between the safety areas.

To allow the projected lines and patterns to be assigned clearly for the camera 3, even in the presence of foreign light, modulated light is used, wherein the modulation can be carried out on the basis of changes in brightness and/or changes in colour. To this end, corresponding modulators are associated with the projectors 1, 1' and are controlled by the control unit provided in the evaluation unit 9.

The camera 3 captures images or pictures of the safety area 10, 11 or of the detected area 8 and forwards these on to the evaluation unit 9. This comprises a simple image-processing program, which is based on relatively simple algorithms for the analysis of the camera data present in the form of pixels. This used algorithm is a deterministic algorithm, wherein it has a constant operating time for a specific configuration of the captured images.

If a person or an object penetrates the safety areas 10, 11, the projection beams from the projector 1 or from the projector 1' are interrupted at the corresponding point and this interruption is determined in the evaluation unit 9 with use of the captured images, such that the border lines projected onto the floor of the safety areas 10, 11 change in the images or disappear completely. Inter alia, the different brightnesses and/or the different colours of a sequence of images are evaluated.

In the illustrated exemplary embodiment, no objects are shown in the safety areas 10, 11, although these areas may accommodate robots or other machines for example, with which collisions are to be avoided. So as to prevent a shadowing of the borders by any robots or machines, it is expedient to arrange a plurality of projectors and a plurality of cameras or other recording devices above the safety areas, wherein the detected area, thus also changes, of course. It is thus possible to safeguard the safety areas fully.

Should penetration of a person or an object be determined by the evaluation unit 9, one or more output signals 12 are generated and can be supplied to warning devices or emergency stop devices.

The evaluation unit may also be connected to a control system for a machine present in the safety area and may adapt the dimensions and forms of the safety area to the safety requirements, irrespective of control parameters of the machine.

As already mentioned, the capturing device or the one camera or the plurality of cameras is/are aligned with the global coordinate system, that is to say it is, or they are, calibrated extrinsically. Functional tests and self-tests can be carried out permanently by means of this extrinsic calibration, both with the projector(s) and/or the camera(s), so as to determine the correct functioning thereof, since it is known in principle which markings/patterns/lines have to appear at which point in the camera image. A failure or fault of the camera arrangement or of the projector arrangement can thus be determined in a simple manner after prior extrinsic calibration.

The detection principle of the device according to the invention will be described in greater detail hereinafter.

The projection-based monitoring device with dynamic safety area(s), and possibly with foreign light suppression, comprises the following features, which can be provided individually or jointly:

1. The projector 1, 1' emits modulated light having a defined frequency. This occurs in a pulsed manner, such that the lines defining the safety area 10, 11 are alternately projected/not projected. Theoretically, the frequency is also adjustable during operation; in the exemplary embodiment 120 Hz is used for example ("stationary" projection to the human eye, no flickering effects). The described alternating capture of images with projected safety area and without projected safety area leads to a reduction in the influence of light changes, such as artificial light sources or sudden shadowing. This is based on the fact that the time difference between the times at which the images are captured is sufficiently small.

2. The at least one camera 3 is synchronised to the respective frequency in such a way that it alternatively captures images that contain a projection or non-projection. On the basis of two successive images, that is to say images that contain a projection/non-projection or vice versa, a differential image is created, which is a binary image that contains a "1" only at those pixel positions at which a projection was detected. This differential image represents the current safety area during operation (current image of the projected safety area).

3. A virtual reference image is determined for each camera on the basis of the components aligned precisely relative to one another and consisting of at least one camera and at least one projector. This (binary) reference image (target image of the projected safety area) uses "1" to define all pixel positions at which a projection is expected.

4. As a result of a comparison of the images of the current state and target state of the safety area, breaches of the safety area are identified if differences are detected between the two images.

The arrangement of the device according to the invention with beam paths both without and with breach of the safety area is illustrated in FIGS. 2 and 3, again schematically.

The arrangement is based on the working principle of light barriers, wherein possible safety areas are not illustrated in greater detail in this instance, but merely beam paths. Each light pixel of the projector 1, which may be equipped for example with MEMS mirror elements, can be considered as part of a light barrier that emits light that is reflected by the ambient environment and is received by the camera as a further part of the light barrier. In the figures, dashed lines denote a light beam 14, which is reflected at the ground, and solid lines denote the corresponding line of sight 15 of the camera 3. An interruption may occur along these two beams 14, 15 (see FIG. 2(b), interruption of the light beam by an object 13), wherein the camera 3 cannot identity whether the light beam 14 or the line of sight 15 is interrupted.

In FIG. 3, the object 13 is introduced into the light beam 14, which is reflected as a line of sight 15 and received by the camera 3, wherein it cannot be identified whether the received beam is located in the "correct" position in the camera image plane 16. Reference signs 14' and 15' denote the corresponding interrupted beams in grey lines, of which the image point in the image plane 16 can be identified as a circle. Due to the evaluation procedure described above, this status is taken into account by comparing the image positions or pixel positions of the light beams or lines of sight in the current camera image with the positions that the beams or pixels should actually have.

Taking into account the above information, it can also be established, besides the breach of the safety area, whether the projector(s) 1, 1' and the camera(s) 3 are functional or misaligned.

There are various scenarios during the evaluation process. If the projector or elements thereof are faulty, no light beams or only some of the light beams provided for the projection will be emitted. The camera accordingly receives no lines of sight. This corresponds to the situation in which an object is located "in front of" the projector. Due to the addition or subtraction of the images with and without projection (current image) and differential formation of current and target images, a pixel image is extracted which reveals that the current image does not match the corresponding target image, which is an indication of a breach of the safety area.

A second case is that the camera is partly faulty, which corresponds to the situation in which an object is "in front of" the camera. The situation according to FIG. 2(b) then occurs. The object interrupts the lines of sight detected by the camera, either fully or in part. The current image contains corresponding gaps in the pixel image and does not match the expected target image. This may be an indication of a breach of the safety area, but may also be an indication of a faulty camera.

A third case is provided if the system is decalibrated, that is to say if the projector and/or the camera position no longer match with those calculated previously. Since the target image is based on the calculation of the intrinsic and extrinsic parameters of the camera, the current image is shifted with respect to the target image.

The target image of a capturing device is based on the extrinsic and intrinsic parameters of the capturing device, and also on the configuration (shape, position, size) of the safety area. This target image is therefore only admissible for as long as there are no changes made to the configuration of the safety area. As soon as the safety area is adapted (for example the position is changed), for example dynamically due to a robot movement, a new target image has to be determined with consideration of the changed configuration of the safety area and is again only valid exactly for this.

It is not possible to distinguish between a breach of the safety area and a fault of the projector. Only if a non-breach of the safety area is detected again at a later time can it be concluded that the safety area was possibly breached. However, in theory it is also possible that a temporary fault of the projector has occurred or that the system was decalibrated temporarily. If a breach is detected, it is not directly clear whether an object has entered the safety area, a fault (camera/projector) is present, or whether the components (camera/projector) are no longer aligned with one another as precisely as possible. In the reverse case (non-breach, of the safety area), it is important that none of the three possible causes can be present.

The invention claimed is:

1. A device for monitoring at least one three-dimensional safety area, said device comprising at least one capturing device that is pointed at a monitored area enclosing the safety area and captures images of the safety area, and comprising an evaluation device for evaluating the images captured by the capturing device in order to determine whether people or objects have entered the safety area, wherein at least one projector is arranged with respect to the monitored area in such a way that it projects lines or patterns defining the safety area in the form of modulated light at a predefined on and off frequency, whereby the lines or patterns are alternately projected and not projected depending on the predefined on and off frequency and wherein the evaluation device evaluates the images with regard to configuration of the projected lines or patterns, wherein the at least one capturing device is synchronized to the predefined on and off frequency to alternately capture images with and without projected lines or patterns and the evaluation device is configured to extract, from successive images with and without projected lines or patterns captured by the at least one capturing device, the configuration of the safety area as a binary current image and to compare the binary current image with a binary target image of the projected safety area determined for the at least one capturing device, the evaluation device being further configured to determine the binary target image as a virtual target image based on intrinsic and extrinsic parameters of the at least one capturing device and the projector and based on the configuration of the known safety area defined by the projected lines or patterns.

2. The device according to claim 1, wherein the at least one projector and the at least one capturing device are designed to create, alternately, an image of the monitored area with projected safety area and an image of the monitored area without projected safety area.

3. The device according to claim 1, wherein the binary current image can be determined by addition and subtraction of the successive images of the monitored area, with and without projected safety area, and a breach of the safety area can be determined by addition and subtraction of the binary current image and of the binary virtual target image.

4. The device according to claim 1, wherein the light projected by the at least one projector is modulated in terms of brightness, preferably pulsed at the predefined frequency, and/or in terms of colour.

5. The device according to claim 1, wherein the lines or patterns are formed as linear borders of the safety area projected by the at least one projector.

6. The device according to claim 1, wherein the lines or patterns are variable over time and/or in terms of their form and/or in terms of their presentation.

7. The device according to claim 1, wherein, in addition to the lines or patterns defining the safety area, the at least one projector is designed to project information in the form of a light script or in the form of light pictograms.

8. The device according to claim 1, wherein the at least one projector projects a plurality of safety areas, which are nested one inside the other or intersect one another.

9. The device according to claim 1, wherein the light of the at least one projector lies in the infrared range.

10. The device according to claim 1, wherein a plurality of capturing devices and/or projectors are arranged above the at least one safety area.

11. The device according to claim 1, wherein the capturing device(s) and/or the projector(s) are calibrated extrinsically.

12. The device according to claim 1, wherein the evaluation device is designed to determine a defect of the at least one projector, the at least one capturing device and/or an incorrect alignment of the projector and/or the capturing device when the safety area is not breached by people and/or objects.

* * * * *